(12) United States Patent
Duffett-Smith et al.

(10) Patent No.: US 6,894,644 B2
(45) Date of Patent: May 17, 2005

(54) RADIO POSITIONING SYSTEMS (75) Inventors: Peter James Duffett-Smith, Cambridge (GB); Malcolm David MacNaughtan, Sydney (AU); John Christopher Clarke, Cambridge (GB); Robert Willem Rowe, Cambridge (GB)

(73) Assignee: Cambridge Positioning Systems Limited, Cambridge (GB)

( * ) Notice: Subject to any disclaimer, the term of this patent is extended or adjusted under 35 U.S.C. 154(b) by 0 days.

(21) Appl. No.: 10/483,485

(22) PCT Filed: Jul. 15, 2002

(86) PCT No.: PCT/GB02/03253

§ 371 (c)(1),
(2), (4) Date: Jan. 13, 2004

(87) PCT Pub. No.: WO03/008990

PCT Pub. Date: Jan. 30, 2003

(65) Prior Publication Data

US 2004/0196186 A1 Oct. 7, 2004

(30) Foreign Application Priority Data

Jul. 17, 2001 (EP) .............................. 01306115

(51) Int. Cl.⁷ .............................. G01S 1/24; G01S 3/02
(52) U.S. Cl. ........................ 342/387; 342/450; 342/464
(58) Field of Search ................................ 342/387, 450, 342/464

(56) References Cited

U.S. PATENT DOCUMENTS

| | | | |
|---|---|---|---|
| 5,838,279 A | 11/1998 | Duffett-Smith et al. | 342/459 |
| 6,094,168 A | 7/2000 | Duffett-Smith et al. | 342/463 |
| 6,275,705 B1 | 8/2001 | Drane et al. | 455/456 |
| 6,342,854 B1 | 1/2002 | Duffett-Smith et al. | 342/457 |
| 6,522,890 B2 | 2/2003 | Drane et al. | 455/456 |
| 6,529,165 B1 | 3/2003 | Duffett-Smith et al. | 342/463 |
| 2002/0149518 A1 * | 10/2002 | Haataja et al. | 342/458 |

FOREIGN PATENT DOCUMENTS

| | | | |
|---|---|---|---|
| EP | 1118871 | 7/2001 | G01S/5/10 |
| EP | 1185878 | 3/2002 | G01S/3/02 |
| EP | 1235076 | 8/2002 | G01S/5/10 |
| EP | 1255122 | 11/2002 | G01S/5/10 |
| EP | 1271178 | 1/2003 | G01S/5/10 |
| EP | 1278074 | 1/2003 | G01S/1/04 |
| EP | 1185877 | 3/2003 | G01S/3/02 |
| EP | 1301054 | 4/2003 | H04Q/7/38 |
| WO | 9730360 | 8/1997 | G01S/5/14 |
| WO | 9911086 | 3/1999 | H04Q/7/38 |
| WO | WO 99/21028 A1 * | 4/1999 | G01S/5/15 |

OTHER PUBLICATIONS

Lopes, L. et al, "GSM Standards Activity on Location," 1999 IEEE.*

* cited by examiner

Primary Examiner—Gregory C. Issing
(74) Attorney, Agent, or Firm—Roylance, Abrams, Berdo & Goodman, L.L.P.

(57) ABSTRACT

The present invention sets out to overcome the hearability problem in CDMA communications networks in which positioning services are provided, by using a separate sampling device (204, 205, 206) for each transmitter (201, 202, 203), which sends to the computing device (208) a representation of the signals transmitted only by that transmitter. A cross-correlation of the representation sent back by the mobile terminal (207) with the representation sent back by the sampling device in the brightest transmitter is performed in the computing device (208), and an estimate of that brightest signal is subtracted from the representation sent back by the mobile terminal (207) in order to reduce its effect on the remaining signals as far as possible. The cross-correlation and subtraction steps are iterated until no useful signals remain to be extracted.

33 Claims, 6 Drawing Sheets

RADIO POSITIONING SYSTEMS

The present invention relates to radio positioning systems generally, and more particularly to improved methods of finding the positions of mobile terminals in radio communication systems, especially those employing Code Division Multiple Access (CDMA) technology.

There are many systems known by which the position of a mobile terminal operating in a radio communications network may be determined. These include using the signals from transmitters not connected with the network, such as the Global Positioning System (GPS) satellites, but others make use of the signals radiated by the mobile terminal and picked up by remote receivers, such as the Time Of Arrival (TOA) and so-called "Radio Finger Printing" systems or, vice versa, using the signals radiated by the network itself and picked up by the mobile terminal. Chief amongst the last category are the Enhanced Observed Time Difference (E-OTD) and Observed Time Difference Of Arrival (OTDOA) systems.

The E-OTD system, although generally applicable to many different communication technologies, has been particularly applied to the Global System for Mobiles (GSM). Two principal, and different, methods of using the timing offsets of signals received from the network transmitters in the position computation have been described in the art. In one, e.g. EP-A-0767594, WO-A-9730360 and AU-B-716647, the signals measured by a fixed receiver are used, in effect, to 'synchronise' the transmissions from the different transmitters. The instantaneous transmission time offsets of each transmitter relative to its neighbours are calculated from the values measured at the fixed receiver using the known positions of the fixed receiver and the transmitters. The timing offsets measured by the mobile terminal can then be used in a calculation based on well-known standard techniques in which the points of intersection of two or more hyperbolic position lines predict the position of the mobile terminal.

The other method (see our EP-B-0303371, U.S. Pat. No. 6,094,168 and EP-A-1025453 the details of which are hereby incorporated by reference and which refer to a system known as Cursor™) makes use of the measurements made by both the fixed receiver and the mobile terminal to calculate the relative time difference between the signals received from each transmitter by both receivers. This results in a calculation based on the intersection of circles centred on the transmitters.

E-OTD methods, as applied to GSM, have been considered for use in wide-band CDMA systems, in particular those within the Universal Mobile Telephone System (UMTS) 'third generation' (3G) technologies. Here, E-OTD has been re-named OTDOA, but it suffers from a major problem, the so-called 'hearability' problem. In CDMA networks generally, signals are transmitted by the network transmitters all using the same radio frequency (RF) channel. In UMTS this channel is about 5 MHz wide. The signals from each transmitter are encoded using a unique 'spreading code' which allows a mobile terminal to pick out the required signal provided that (a) it knows the spreading code used by that transmitter, and (b) its internal clock is synchronized with the transmitter signals. To assist with the latter, each transmitter also radiates a 'pilot code' within the same RF channel whose coding and other characteristics make it easily distinguishable. The mobile terminal first detects and locks on to the pilot signal, receives the spreading code used by that transmitter, and then is able to decode the main transmissions. The hearability problem arises when the mobile terminal is near to a transmitter. E-OTD systems (and therefore OTDOA systems) require the measurements of the time offsets associated with at least three geographically-distinct transmitters, but when the mobile terminal is too close to a transmitter, the signals from the more-distant transmitters are drowned out by the local signals to the extent that their time offsets cannot be measured. One technique, known as 'Idle Period Down Link' (IPDL), has been proposed to overcome this problem by which the transmissions from the local transmitter are turned off periodically in a so-called 'idle period' during which the signals from the distant transmitters may be received. This has the serious disadvantages that (a) the capacity of the network to carry voice & data traffic is diminished, and (b) it is complicated to install and operate, requiring in one of its forms additional messaging in the network to coordinate the idle periods amongst the transmitters.

The present invention involves an adaptation of the Cursor™ system, especially as described in our U.S. Pat. No. 6,094,168, to CDMA systems in general and particularly to UMTS in such a fashion as to overcome the hearability problem. No idle period is required, and the communications function can therefore operate with full capacity. It has the further advantages that (a) the fixed receivers associated with E-OTD and OTDOA are particularly simple and low-cost devices, and (b) the additional software required in the mobile terminals is less complex than that in GSM terminals.

The Cursor™ system, as described in U.S. Pat. No. 6,094,168, uses two receivers, one fixed and at a known location and the other within the mobile terminal, to receive the signals radiated by each transmitter taken separately. Representations of the received signals are sent back to a computing node where they are compared (generally by cross-correlation) to determine the time offset of receipt of the signals by each receiver. This process is repeated for at least two other geographically distinct transmitters (transmitting on different RF channels in a GSM system) to obtain the three time offsets required for a successful position computation.

In direct sequence CDMA systems the transmitters use the same RF channel. A direct application of the Cursor™ system to CDMA would therefore result in a cross-correlation with many peaks, each corresponding to the alignment of the signals received from a particular one of the transmitters by both receivers. If it were possible to measure the peaks associated with at least the three required transmitters, the system would serve admirably for positioning. However, as illustrated in the particular embodiment described below, the signal to noise ratios (SNRs) associated with more-distant transmitters are often too small, and we have a similar hearability problem as described above.

A first aspect of the invention therefore provides a method of finding the position or state of motion of a terminal in a communications network having a plurality of transmitters, the terminal having a radio receiver, the method comprising the steps of (a) creating at the terminal a section of a representation of the signals from the transmitters received by the radio receiver;

(b) creating a first section of a representation of the signal transmitted by a first of said transmitters, and creating a second section of a representation of the signals transmitted by a second of said transmitters, each of which sections overlaps in time with the section created at the terminal;

(c) calculating an estimate of the signal received at the terminal from said first transmitter using said first section, and subtracting said estimate from the section created at the terminal, to produce a residual representation;

(d) performing a calculation using said residual representation and said second section, and estimating the time offset between them; and (e) calculating the position of the terminal using said time offset.

Preferably, the first and second sections are created at the respective first and second transmitters, but they may be created elsewhere. They may be created in one or more sampling devices attached to the respective transmitters or located elsewhere, or they may be created by computer programs running anywhere in the communications network, or elsewhere, using information supplied from the network about the transmitted signals.

The various signal representation sections may be sent to one or more computing devices in which said estimates and time offsets, and the terminal location, may be calculated. In some embodiments, the time offset between said section of a representation of the signals received by the receiver and said first section may first be calculated, and may then be used in the calculation of said estimate. The time offset may be calculated using said sections or it may be calculated by other means, for example by calculating the time offset of a known component of the signal such as the pilot code.

The present invention thus overcomes the hearability problem by, for example, using a separate sampling device for each transmitter, the equivalent of the fixed receiver in an E-OTD system, which sends to a computing device a representation of the signals transmitted only by that transmitter, by performing a cross-correlation of the representation sent back by the mobile terminal with the representation sent back by the sampling device associated with one of the transmitters to estimate the time offset between them, and by subtracting an estimate of that signal from the representation sent back by the mobile terminal in order to reduce its effect on the remaining signals as far as possible. The cross-correlation and subtraction steps may be iterated until no useful signals remain to be extracted. Simulations show that this provides at least as much hearability gain as the IPDL method. However, of course, the transmitted signals are unaffected by the method of the invention, so that, for example, the transmissions do not need to be interrupted.

In some systems, the hearability problem may be solved simply by subtracting an estimate of just one of the signals, usually the brightest, leaving a residual representation in which the time offsets of the pilot codes, or any other known portions of the transmitted signals, may be determined.

Thus, a second aspect of the invention provides a method of finding the position or state of motion of a terminal in a communications network having a plurality of transmitters, the terminal having a radio receiver, the method comprising the steps of (a) creating at the terminal a section of a representation of the signals from the transmitters received by the radio receiver;

(b) creating a section of a representation of the signal transmitted by one of said transmitters, which overlaps in time with the section created at the terminal;

(c) calculating an estimate of the signal received at the terminal from said transmitter using said section of the representation of the signal transmitted by said transmitter, and subtracting said estimate from the section created at the terminal, to produce a residual representation;

(d) performing one or more calculations using said residual representation and one or more known components of the signals transmitted by the communications network in order to estimate the time offset of the respective component; and (e) calculating the position of the terminal using any of said time offsets.

The section of the representation of the signals received by the receiver at the terminal may be recorded in the terminal before being sent to a computing device. Alternatively, the section may be transferred in real time to the computing device and a recording made there.

Preferably, the section of the representation of the signals transmitted by a transmitter is created at said transmitter, but it may be created elsewhere. It may be created in a sampling device attached to said transmitter or located elsewhere, or it may be created by a computer program running anywhere in the communications network, or elsewhere, using information supplied from the network about the transmitted signals.

The calculations may be carried out in a computing device which may be in the handset or elsewhere, for example, a processor connected to the network.

The representation of the signals received by the receiver attached to the terminal may be a digitised version of the received signals converted first to baseband in the receiver. The representation of the signals transmitted by a transmitter may be a digitised version of the transmitted signals converted first to baseband.

In order to ensure an overlap of the respective sections, a suitably chosen component of the transmitted signals may be used to indicate the start of sampling.

The time offset between said section of the signals received from a transmitter by the receiver attached to the terminal and said section of a representation of the signal transmitted by one of said transmitters may be computed using a cross-correlation or other comparison between the respective sections, or it may be computed as part of the normal communications process in the terminal, or it may be computed using a known component of the signals transmitted by the communications network, for example a pilot code.

The known components of the transmitted signals in the second aspect of the invention may, for example, be the pilot codes.

The invention also includes apparatus for carrying out the invention.

Thus, there is provided, for use in the carrying out the method of the first aspect of the invention, a communications network, the network comprising (a) a computing device or devices;

(b) a terminal having a radio receiver attached to the terminal, means for creating a section of a representation of the signals, received by the radio receiver, from the transmitters of the communications network, and means for sending the section to the computing device or devices;

(c) sampling devices associated with respective first and second of said transmitters for creating respective first and second sections of representations of the signal transmitted by the respective transmitter which overlap in time with the section created at the terminal, and for sending the sections of the representations created at said transmitters to said computing device or devices;

the computing device or devices being adapted to perform 1. a calculation of an estimate of the signals received at the terminal from said first transmitter using said first section;

2. a subtraction of said estimate from the section sent by the terminal, to produce a residual representation;

2. a calculation using said residual representation and said second section to produce an estimate of the time offset between them; and 3. a calculation of the position of the terminal using said time offset.

The invention also includes a computing device or devices for use in such a communications network, adapted to perform the tasks set out in the paragraph immediately above.

The invention also includes, for use in the carrying out the method of the second aspect of the invention, a communications network comprising (a) a computing device or devices;

(b) a terminal having a radio receiver attached to the terminal, means for creating a section of a representation of the signals, received by the radio receiver, from the transmitters of the communications network, and means for sending the section to a computing device;

(c) devices associated with the transmitters for creating sections of representations, of the signal transmitted by the respective transmitter, which overlap in time with the section created at the terminal, and for sending said sections to the computing device or devices;

the computing device or devices being adapted to perform 1. a generation of a reference signal;

2. a calculation of an estimate of the signal received at the terminal from said transmitter using said section of a representation of the signal transmitted by the corresponding transmitter;

3. a subtraction of said estimate from the section sent by the terminal to produce a residual representation;

4. one or more calculations using said residual representation and said reference to estimate the time offset between the at least one signal and said reference; and 5. a calculation of the position of the terminal using the or any of the time offsets.

The invention also includes a computing device or devices for use in such a communications network, adapted to perform the tasks set out in the paragraph immediately above.

The means for carrying out the calculations in the computing device or devices may be components of hardware and/or software.

Therefore, the invention includes a computer program or programs having computer program code means for carrying out the steps performed in the computing device or devices as described above.

The terminal may be a part of a positioning system, for example as described in any of EP-A-0767594, WO-A-9730360, AU-B-716647 EP-B-0303371, U.S. Pat. No. 6,094,168 and EP-A-1025453 and may be a fixed device associated with a transmitter (for example, the 'fixed receiver' or 'Location Measurement Unit, LMU'), whose purpose is to receive signals from distant transmitters as well as from its associated transmitter, in which case the method of the invention includes the estimation of and subtraction of the signals from its associated transmitter in order to allow it to measure the time offsets of the signals received from distant transmitters.

A third aspect of the invention therefore provides a method of finding the time offset between at least one of the signals received from a plurality of the transmitters of a communications network by a receiver attached to a fixed terminal and a reference generated in the fixed terminal, the method comprising the steps of a) creating at the fixed terminal a section of a representation of the signals from the transmitters received by the radio receiver;

b) creating a section of a representation of the signal transmitted by one of said transmitters, which section overlaps in time with the section created at the fixed terminal;

c) calculating an estimate of the signal received at the fixed terminal from said transmitter using said section of a representation of the signal transmitted by said transmitter, and subtracting said estimate from the section created at the fixed terminal, to produce a residual representation;

d) performing a calculation using said residual representation and said reference in order to estimate the time offset between a component of the residual representation and said reference.

The E-OTD positioning systems described generally above work with unsynchronised networks, i.e. any common component of the signals transmitted by any one transmitter is not synchronised in time with the transmission of that component by any other of the transmitters, but instead is transmitted after an unknown time delay, sometimes called the Relative Transmission Delay (RTD). The position calculation requires that this delay is known, and so the positioning systems employ fixed receivers at known locations throughout the network which are set up to measure the transmitted signals and compute the RTDs. It has been described above how the hearability problem hinders the straightforward application of the E-OTD techniques to direct-sequence CDMA systems. However, the third aspect of the present invention overcomes the hearability problem by allowing the very strong signals from a local transmitter to be subtracted from the signals received by the fixed receiver, thus allowing the much weaker signals from the distant transmitters to be measured. The method of application of E-OTD to CDMA systems then follows that described, for example, in our EP-A-1025453.

The invention may be further understood by reference to the accompanying drawings, in which.

Figure 1:
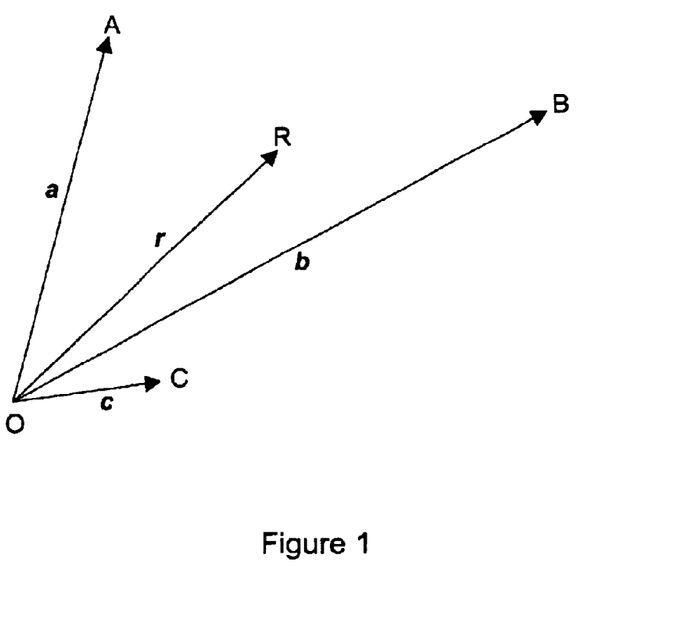
FIG. 1 shows the geometry of a two-dimensional communications system in which all the transmitters and the mobile terminal lie in one plane.

The following mathematical analysis provides an understanding of the concepts involved in the present invention. FIG. 1 shows the geometry of a two-dimensional system in which all the transmitters and the mobile terminal lie in one plane. The positions of transmitters A, B, and C are represented by the vectors a, b, c, all with respect to the same common origin, O. The mobile terminal, R, is at vector position r. Each of the transmitters has incorporated with it a sampling device, as described above, which samples the signals transmitted by that transmitter and which sends back to a computing device (not shown in FIG. 1) a representation thereof. Let us suppose that the mobile terminal is nearest to transmitter A, then B, then C. The computing device first performs a cross-correlation between the representation of the signals received from A, B, and C (all on the same RF channel) by R, and the representation of the signals transmitted by A. Since the signals from A, B, and C have orthogonal spreading codes, the cross-correlation results in a single peak whose position represents the time-offset of the receipt of the signals from A by R, together with the clock error, $\epsilon$, of the receiver in the mobile terminal. This time offset, $\Delta t_A$, is given by $$v\Delta t_A = |r-a| + \epsilon,$$

where v is the speed of the radio waves, and the vertical bars denote the magnitude of the contained vector quantity. Similarly, for B and C we have $$v\Delta t_B = |r-b| + \epsilon,$$

$$v\Delta t_C = |r-c| + \epsilon. \qquad \{1\}$$

Having established the time offset of the signals from A, the computing node now subtracts an estimate of the signal received from A by R. The representations of the signals radiated at time t by the transmitters A, B, and C, may be denoted by the functions $S_A(t)$, $S_B(t)$, and $S_C(t)$ respectively. The signal received by the mobile terminal comprises a combination of these. In the absence of multipath, noise and non-linear effects, the representation of the received signals may be denoted by V(t), where $$V(t) = \alpha S_A(t-\Delta t_A) + \beta S_B(t-\Delta t_B) + \gamma S_C(t-\Delta t_C).$$

and $\alpha$, $\beta$, $\gamma$ are constants representing the path losses to the mobile terminal from the respective transmitters. A software program running in the computing node estimates the magnitude of $S_A(t)$, delayed by $\Delta t_A$, to subtract from V(t), for example by finding the value of a which minimises the mean square amplitude of the residual V'(t). In the perfect case this would remove the contribution of A altogether, so that $$V'(t) = \beta S_B(t-\Delta t_B) + \gamma S_C(t-\Delta t_C).$$

The cross-correlation is now carried out between V'(t) and $S_B(t)$ to estimate $\Delta t_B$, and a further subtraction made to remove the contribution of B from the residual, V''(t), where $$V''(t) = \gamma S_C(t-\Delta t_C),$$

if the subtraction is perfect. Finally, a cross-correlation between V''(t) and $S_C(t)$ results in an estimate of $\Delta t_C$. Equations {1} can then be solved for r as described in U.S. Pat. No. 6,094,168.

In practice, the signals received by the mobile terminal are corrupted by noise, interference and multipath effects. Furthermore, the representations of the signals may be in a digital format of low resolution. The process of subtraction will not be perfect in these circumstances, but may nevertheless be sufficient to overcome the hearability problem. Where it is possible to estimate the channel parameters, the effects of multipath propagation can be allowed for, resulting in better signal subtractions.

One of the requirements of the invention is that the recordings of the signals made at A, B, C, and R overlap in time with each other. The recording process in the mobile terminal can be initiated, for example, by the receipt of a particular aspect of the signal transmitted by the serving transmitter (A in the above analysis). The recordings made in the transmitters must all be loosely synchronised with this aspect. Where the transmitters are synchronised with each other, as in the IS 95 standard, the aspect will be transmitted at approximately the same time by all transmitters in the network. In unsynchronised systems, however, other means such as GPS or the concepts described in our WO-A-00/73814 and EP application no. 01301679.5 may be used for synchronisation.

One embodiment of a system according to the invention will now be described with reference to FIGS. 2 to 7.

Figure 2:
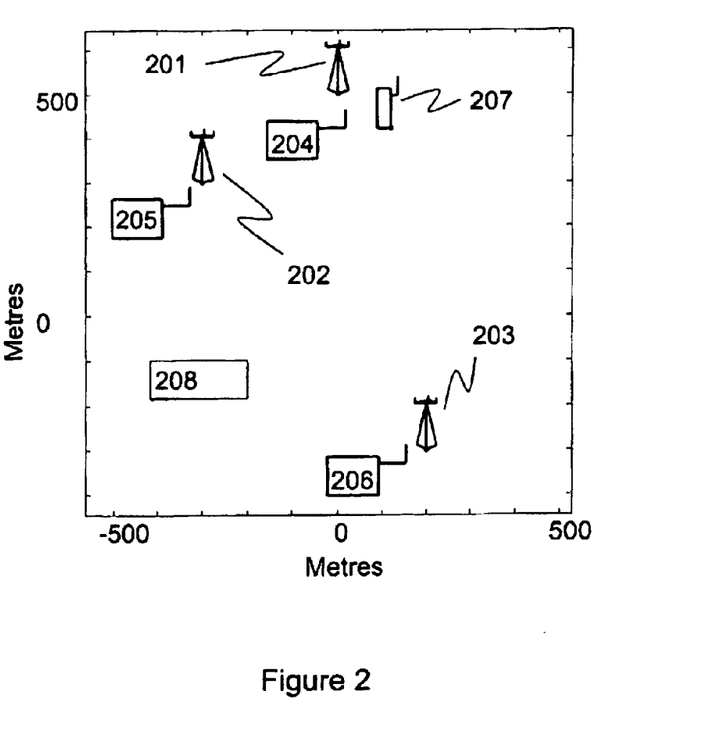
FIG. 2 shows a simplified UMTS network.

FIG. 2 shows a simplified UMTS system consisting of three communications transmitters (Node Bs) 201, 202, 203, each of which has a sampling device 204, 205, 206, a single terminal (user equipment, UE) 207, and a computing device (serving mobile location centre, SMLC) 208. Each Node B has an omnidirectional antenna, and is configured to transmit signals typical of network traffic load. Table 1 below indicates the different physical channels in use, together with their power levels and symbol rates. The acronyms appearing in the left-hand column, P-CPICH etc., are those that have been adopted by the industry to represent the channels. Random binary sequences are used to modulate the DPCHs. The three Node Bs use orthogonal primary scrambling codes, in this case numbers 0, 16 and 32 respectively.

TABLE 1

Node B channel configuration

| Channel | Relative power Level/dB | Symbol rate/Kss$^{-1}$ |
| --- | --- | --- |
| P-CPICH | −10 | 15 |
| P-SCH | −10 | 15 |
| S-SCH | −10 | 15 |
| P-CCPCH | −10 | 15 |
| PICH | −15 | 15 |
| DPCH0 | Note 1 | Note 2 |
| DPCH1 | Note 1 | Note 2 |
| DPCH2 | Note 1 | Note 2 |
| . . . | Note 1 | Note 2 |
| . . . | Note 1 | Note 2 |
| DPCH63 | Note 1 | Note 2 |
| DPCH64 | Note 1 | Note 2 |

Note 1:
DPCH power levels were chosen randomly from −10 dB to −25 dB
Note 2:
DPCH symbol rates were chosen randomly from 15 to 240 Kss$^{-1}$ The Node Bs are tightly synchronised. This is not a requirement in normal practice, but is convenient for the purpose of demonstration.

It will be noted from FIG. 2 that the UE 207 is relatively close to Node B 201 and at greater distances from Node Bs 202 and 203. Thus the signal from Node B 201 is the strongest (0 dB relative to itself) with the signal from Node B 202 weaker at −15 dB and that from Node B 203 weakest of all at −30 dB. The three sampling devices 204, 205, 206 are instructed by the SMLC 208 to record and report the signal transmitted by the associated Node B during the first 256 chips immediately following the start of the next second. These signals are sampled at a rate of 2 samples per chip, with a resolution of 4 bits.

Figure 3:
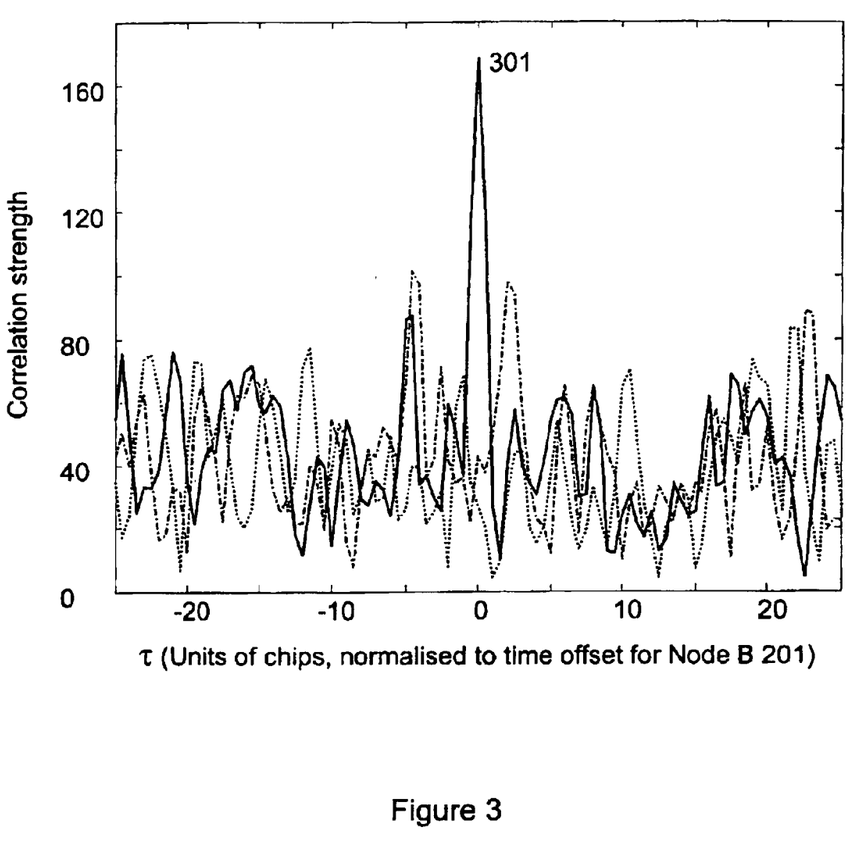
FIG. 3 illustrates the correlation of a reference copy of the primary scrambling code used on the pilot code channel (CPICH) by each Node B of the UMTS network with a recording of the received signal.

Before describing how the system is used to illustrate the present invention, the problem of hearability is highlighted by considering the conventional E-OTD approach to measuring the time offsets of the signals received by the UE 207. A reference copy of the primary scrambling code used on the CPICH by each Node B (i.e. the first 256 chips of each of scrambling codes 0, 16 and 32), is cross-correlated with the signal received by the UE 207 and a search is made for the highest correlation peak. FIG. 3 illustrates a typical result. Note that the signals received by the UE 207 are also sampled at a rate of 2 samples per chip, with a resolution of 4 bits. The resulting cross-correlation profiles show one clearly distinguishable peak 301 in the correlation for scrambling code 0, corresponding to the time offset of the signals from Node B 201. However, the cross-correlation results for the codes 16 and 32 do not yield any clear peaks. This is because the signals received by the UE 207 from Node Bs 202 and 203 are swamped by the relatively strong reception from Node B 201. Were they visible, these peaks should be positioned to the right of the visible peak 301 by 1 and 2 microseconds respectively for the signals from Node Bs 202 and 203 (corresponding to 3.8 and 7.6 chips).

The lack of detection of the signals from 202 and 203 means that it is not possible to compute an E-OTD position fix, since at least three independent timings are needed. It has already been described how the use of idle periods (e.g. the IPDL method) can be used to overcome this problem.

The present invention is now illustrated using the same test system. In this case, each sampling device 204, 205, 206 records a section of the signals transmitted by its associated Node B 201, 202, 203 respectively. This section is one symbol in duration and is again sampled at a rate of 2 samples per chip, with a resolution of 4 bits. The UE 207 also records a 256-chip section of the signals it receives, aligned with the first symbol on the CPICH in a particular timeslot, at the same sampling rate and resolution.

Figure 4:
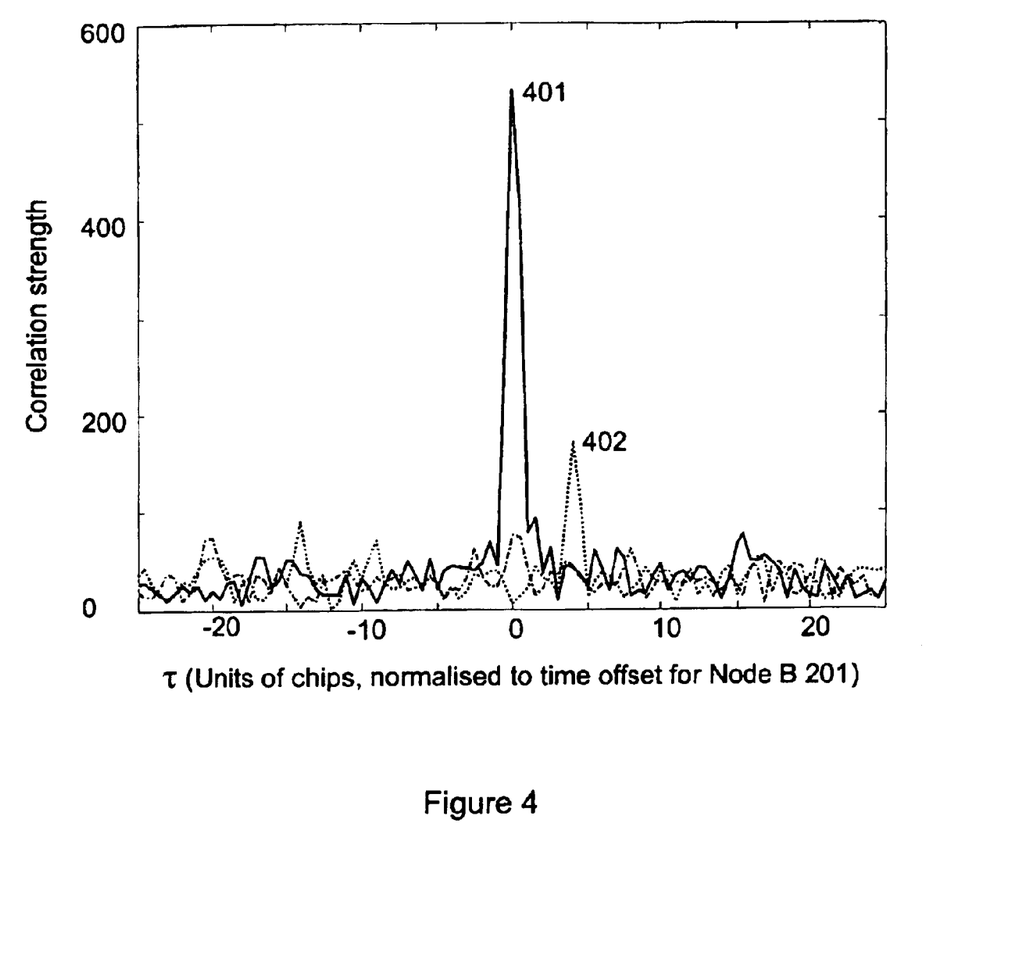
FIG. 4 shows the result of cross-correlating the recording received by a terminal with recordings of the transmitted signals.
Figure 5:
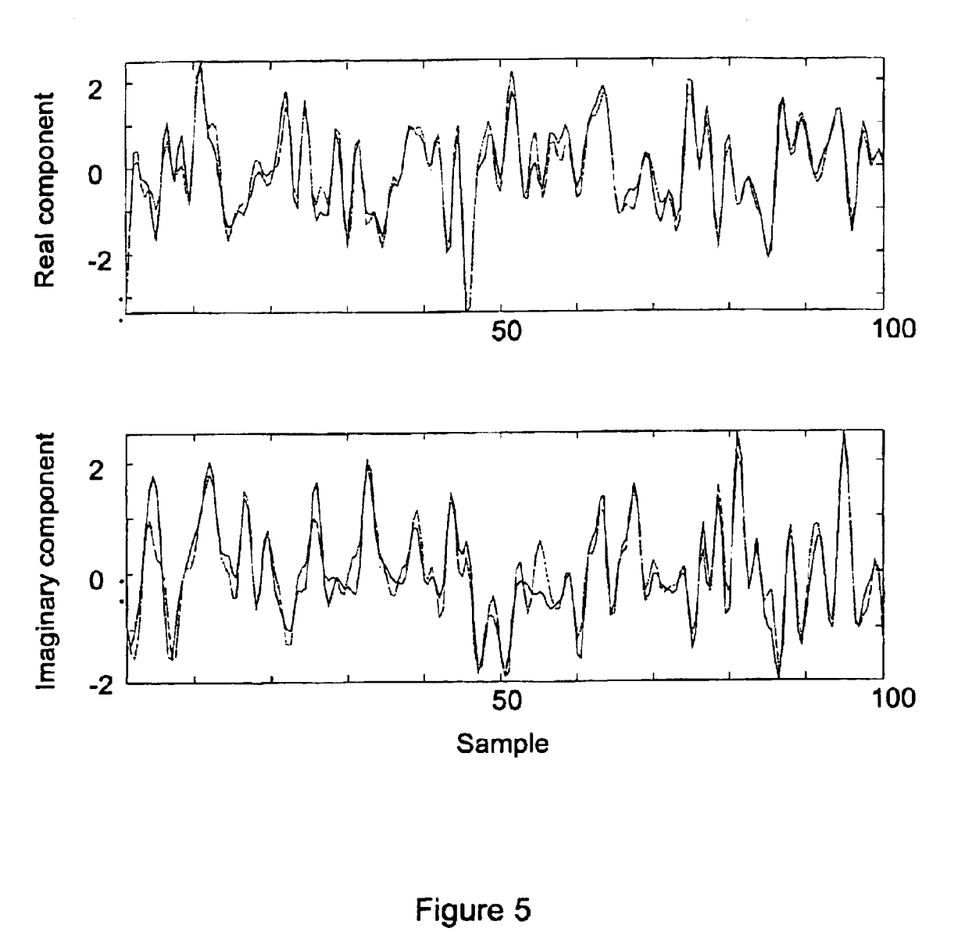
FIG. 5 illustrates measured and estimated recordings.

At the SMLC 208, the three recordings reported by the three sampling devices 204, 205, 206 are each cross-correlated in turn with the recording made by the UE 207, and the results are shown in FIG. 4. The peaks of the resulting correlation profiles are used to determine the relative levels of the three contributions in the received signal and hence the order in which they are to be subtracted. Once again, the cross-correlation for Node B 201 yields the largest peak 401. Note also that, in contrast with FIG. 3, the cross-correlation for Node B 202 also yields a clear peak 402. This is because the cross-correlation is performed using the total signal transmitted by the Node Bs rather than merely using the CPICH, which represents a fraction of the total transmitted energy in each case.

Having identified the time offset of the signal from Node B 201, the recording of the signal reported by the sampling device 204 is now used to construct an appropriately scaled, delayed and phase-rotated copy of that signal. The results of this process are plotted in FIG. 5. The upper plot shows the real component of the original signal recorded by the UE 207 as a solid curve whilst the dotted curve shows the estimated scaled, delayed and rotated signal. The lower plot shows a similar comparison of the imaginary parts of received and estimated signals. Note that whilst a duration of 256 chips is actually used in the example, the time axis in this Figure has been limited to about 50 chips. The estimated recordings are subtracted from the total UE recording leaving a residual recording.

Figure 6:
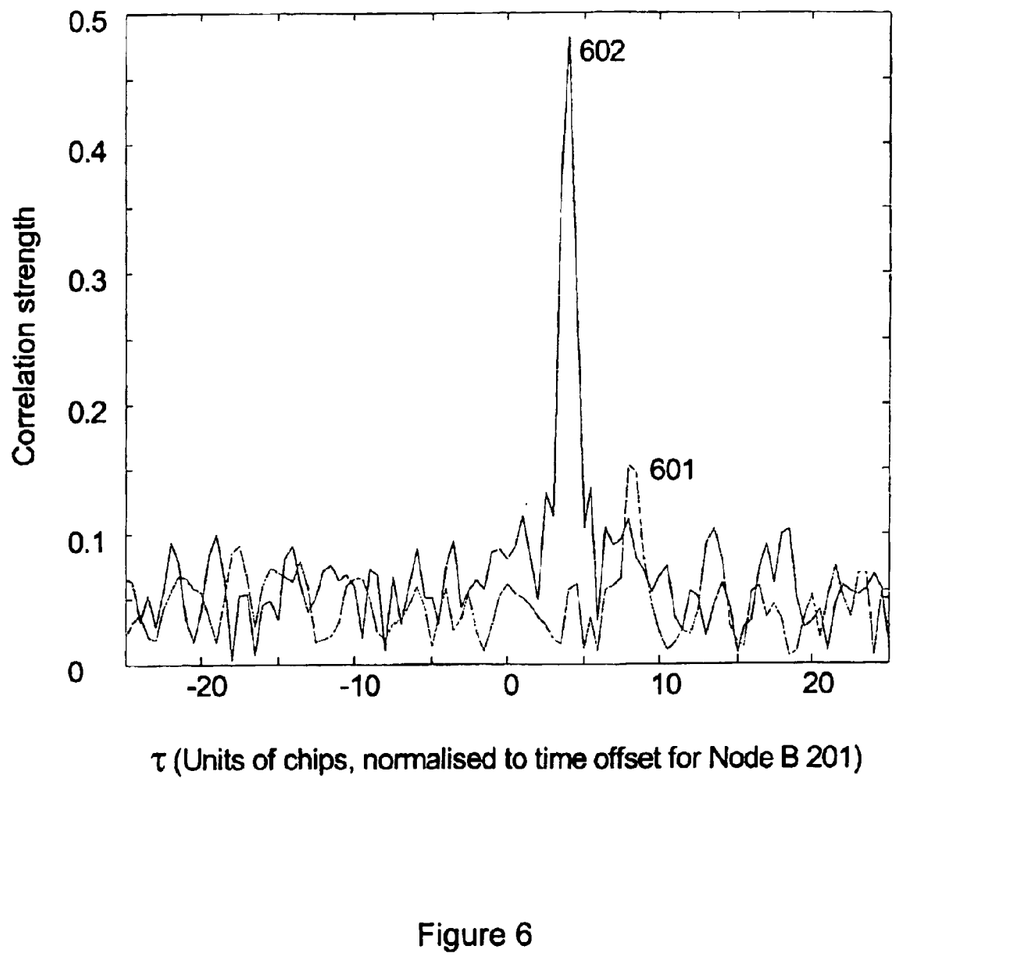
FIG. 6 show the cross-correlation of a residual recording with recordings of transmitted signals.

The recordings from the sampling devices 205 and 206 are now cross-correlated with the residual recording giving the results shown in FIG. 6. Note that in this case, following the removal of the signal from Node B 201, there is a clear correlation peak 601 for the signals from Node B 203 as well as a peak 602 for Node B 202. These peaks are used to estimate the time offsets of the corresponding signals, giving sufficient independent timing measurements (three in this case) to compute a position fix.

Figure 7:
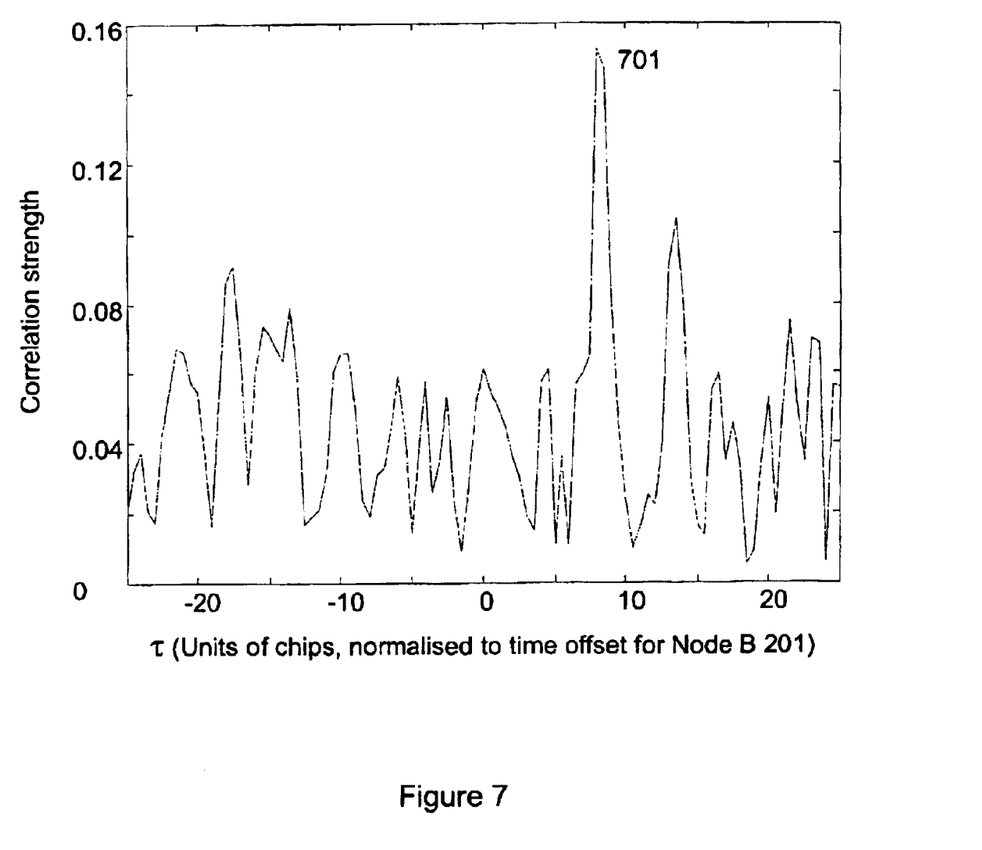
FIG. 7 shows the cross-correlation of a further residual recording with a recording of a transmitted signal.

If the peak 601 corresponding to the signals from Node B 203 is too weak to be resolved, a further iteration could be undertaken in which the signals from Node B 202 could be subtracted to yield a second residual signal (FIG. 7). There is a clear correlation peak 701 at a delay of approximately 7 chips as expected.

In summary therefore, the problem caused by the relatively high level of the signals from Node B 201, which prevents measurement of the time offsets for the signals from Node Bs 202 and 203 by the conventional method, is overcome by the iterative approach of the present invention which involves the estimation and subtraction of the strongest remaining signal so that the next weaker one can be detected.

As explained earlier, the present invention can also be applied to the fixed receivers (LMUs) of a positioning system using conventional E-OTD techniques. In this case, a fixed receiver is usually co-sited with the transmitter, but is connected to a separate receiving antenna. The LMU, which needs to support a large dynamic range and display exceptionally good linear characteristics, receives the signals picked up by its antenna, creates a section of a representation of the signals as described above, and sends the section to a computing device. A sampling device associated with the transmitter provides a contemporaneous section of the signal transmitted by the transmitter. A calculation is then carried out in which an estimate of the signal transmitted by the transmitter and picked up by the receiving antenna is subtracted from the representation (to produce a residual representation) in order to reduce its effect on the signals received from the other, more-distant, transmitters of the network. Thus far, the process is exactly as described in the particular example discussed above. The purpose of the LMU, however, is to furnish as many timing offsets between the signals received from all the transmitters as it can. The very strong signal received from the local transmitter furnishes an accurate timing for that transmitter through analysis of the section of the representation sent by the LMU to the computing device, and the residual representation may then be analysed for the remaining signals from other transmitters.

The analysis of both the representation and the residual representation to find the time offset of a particular component may be carried out as follows. The pilot code, transmitted on CPICH by a given transmitter, is known in advance as a binary sequence. This is modulated by passing it through, for example, a raised-cosine filter so that it matches as closely as possible the signal received from the transmitter on CPICH. This reference sequence is then cross-correlated with the section of the representation of the received signals, or the section of the residual representation, in order to identify a peak corresponding to the time offset of the signal received from the corresponding transmitter with respect to the reference, as illustrated above in FIG. 3.

We claim:

1. A method of finding the position or state of motion of a terminal in a communications network having a plurality of transmitters, the terminal having a radio receiver, the method comprising the steps of (a) creating at the terminal a section of a representation of the signals from the transmitters received by the radio receiver;

(b) creating a first section of a representation of the signal transmitted by a first of said transmitters, and creating a second section of a representation of the signals transmitted by a second of said transmitters, each of which sections overlaps in time with the section created at the terminal;

(c) calculating an estimate of the signal received at the terminal from said first transmitter using said first section, and subtracting said estimate from the section created at the terminal, to produce a residual representation;

(d) performing a calculation using said residual representation and said second section, and estimating the time offset between them; and (e) calculating the position of the terminal using said time offset.

2. A method of finding the position or state of motion of a terminal in a communications network having a plurality of transmitters, the terminal having a radio receiver, the method comprising the steps of (a) creating at the terminal a section of a representation of the signals from the transmitters received by the radio receiver;

(b) creating a section of a representation of the signal transmitted by one of said transmitters, which overlaps in time with the section created at the terminal;

(c) calculating an estimate of the signal received at the terminal from said transmitter using said section of the representation of the signal transmitted by said transmitter, and subtracting said estimate from the section created at the terminal, to produce a residual representation;

(d) performing one or more calculations using said residual representation and one or more known components of the signals transmitted by the communications network in order to estimate the time offset of the respective component; and (e) calculating the position of the terminal using any of said time offsets.

3. A method of finding the time offset between at least one of the signals received from a plurality of the transmitters of a communications network by a receiver attached to a fixed terminal and a reference generated in the fixed terminal, the method comprising the steps of (a) creating at the fixed terminal a section of a representation of the signals from the transmitters received by the radio receiver;

(b) creating a section of a representation of the signal transmitted by one of said transmitters, which section overlaps in time with the section created at the fixed terminal;

(c) calculating an estimate of the signal received at the fixed terminal from said transmitter using said section of a representation of the signal transmitted by said transmitter, and subtracting said estimate from the section created at the fixed terminal, to produce a residual representation; and (d) performing a calculation using said residual representation and said reference in order to estimate the time offset between the at least one signal and said reference.

4. A method according to any of claims 1, 2 or 3, wherein the or each section of a representation of the signal transmitted by a respective transmitter is created at a respective transmitter.

5. A method according to any of claims 1, 2 or 3, wherein the or each section of a representation of the signal transmitted by a respective transmitter is created in a sampling device associated with the respective transmitter.

6. A method according to any of claims 1, 2 or 3, in which the signal representation sections are sent to one or more computing devices in which said estimates and time offsets are calculated.

7. A method according to claim 6, in which the terminal location is calculated in said one or more computing devices.

8. A method according to claim 1, in which the time offset between said section of a representation of the signals received by the receiver and said first section is first calculated, and then used in the calculation of said estimate.

9. A method according to any of claims 1, 2 or 3, in which the section of the representation of the signals received by the receiver at the terminal is recorded in the terminal before being sent to one or more computing devices.

10. A method according to any of claims 1, 2 or 3, in which the section of the representation of the signals received by the receiver at the terminal is transferred in real time to one or more computing devices and a recording or recordings made there.

11. A method according to claim 6, in which the computing device is in the handset.

12. A method according to claim 6, in which one or more of the computing devices each comprise a processor connected to the network.

13. A method according to any of claims 1, 2 or 3, in which the representation of the signals received by the receiver is a digitised version of the received signals converted first to baseband in the receiver.

14. A method according to any of claims 1, 2 or 3, in which the representation of the signals transmitted by a transmitter is a digitised version of the transmitted signals converted first to baseband.

15. A method according to any of claims 1, 2 or 3, in which, in order to ensure an overlap of the respective sections, a known component of the transmitted signals is used to indicate the start of sampling.

16. A method according to any of claims 1, 2 or 3, in which the calculations performed include cross-correlations.

17. A method according to claim 2, in which the known components of the transmitted signals are the pilot codes.

18. A communications network comprising (a) a computing device or devices;

(b) a terminal having a radio receiver attached to the terminal, means for creating a section of a representation of the signals, received by the radio receiver, from the transmitters of the communications network, and means for sending the section to the computing device or devices;

(c) sampling devices associated with respective first and second of said transmitters for creating respective first and second sections of representations of the signal transmitted by the respective transmitter which overlap in time with the section created at the terminal, and for sending the sections of the representations created at said transmitters to said computing device or devices;

the computing device or devices being adapted to perform 1. a calculation of an estimate of the signals received at the terminal from said first transmitter using said first section;

2. a subtraction of said estimate from the section sent by the terminal, to produce a residual representation;

3. a calculation using said residual representation and said second section to produce an estimate of the time offset between them; and 4. a calculation of the position of the terminal using said time offset.

19. A communications network comprising (a) a computing device or devices;

(b) a terminal having a radio receiver attached to the terminal, means for creating a section of a representation of the signals, received by the radio receiver, from the transmitters of the communications network, and means for sending the section to a computing device;

(c) devices associated with the transmitters for creating sections of representations, of the signal transmitted by the respective transmitter, which overlap in time with the section created at the terminal, and for sending said sections to the computing device or devices;

the computing device or devices being adapted to perform 1. generation of a reference signal;
2. calculation of an estimate of the signal received at the terminal from said transmitter using said section of a representation of the signal transmitted by the corresponding transmitter;
3. a subtraction of said estimate from the section sent by the terminal to produce a residual representation;
4. one or more calculations using said residual representation and said reference to estimate the time offset between a component of the residual representation and said reference; and
5. a calculation of the position of the terminal using the or any of the time offsets.

20. A communications network according to claim 18 or claim 19, in which the, section of the representation of the signals received by the receiver at the terminal is recorded in the terminal before being sent to a computing device.

21. A communications network according to claim 18 or claim 19, in which the section of the representation of the signals received by the receiver at the terminal is transferred in real time to a computing device and a recording made there.

22. A communications network according to claim 18 or claim 19, in which the section of the representation of the signal transmitted by a transmitter is obtained from a sampling device associated with the corresponding transmitter.

23. A communications network according to claim 18 or claim 19, in which the computing device is in a handset.

24. A communications network according to claim 18 or claim 19, in which the computing device comprises a processor connected to the network.

25. A communications network according to claim 18 or claim 19, in which the representation received by the receiver is a digitised version of the received signals converted first to baseband in the receiver.

26. A communications network according to claim 18 or claim 19, in which the representation of the signal transmitted by a transmitter is a digitised version of the transmitted signal converted first to baseband.

27. A communications network according to claim 18 or claim 19, in which, in order to ensure an overlap of the respective sections, a known component of the transmitted signals is used to indicate the start of sampling.

28. A communications network according to claim 18 or claim 19, in which the calculations performed in the computing device include cross-correlations.

29. A communications network according to claim 19, in which the component of the residual representation is a pilot code.

30. A computing device or devices for use in a communications network comprising a terminal having a radio receiver attached to the terminal, means for creating a section of a representation of the signals, received by the radio receiver, from the transmitters of the communications network, and means for sending the section to the computing device or devices; and sampling devices associated with respective first and second of said transmitters for creating respective first and second sections of representations of the signal transmitted by the respective transmitter which overlap in time with the section created at the terminal, and for sending the sections of the representations created at said transmitters to said computing device or devices;

the computing device or devices being adapted to perform 1. a calculation of an estimate of the signals received at the terminal from said first transmitter using said first section;
2. a subtraction of said estimate from the section sent by the terminal, to produce a residual representation;
3. a calculation using said residual representation and said second section to produce an estimate of the time offset between them; and
4. a calculation of the position of the terminal using said time offset.

31. A computing device or devices for use in a communications network comprising a terminal having a radio receiver attached to the terminal, means for creating a section of a representation of the signals, received by the radio receiver, from the transmitters of the communications network, and means for sending the section to the computing device or devices; and devices associated with the transmitters for creating sections of representations, of the signal transmitted by the respective transmitter, which overlap in time with the section created at the terminal, and for sending said sections to the computing device or devices;

the computing device or devices being adapted to perform 1. a generation of a reference signal;
2. a calculation of an estimate of the signal received at the terminal from said transmitter using said section of a representation of the signal transmitted by the corresponding transmitter;
3. a subtraction of said estimate from the section sent by the terminal to produce a residual representation;
4. one or more calculations using said residual representation and said reference to estimate the time offset between a component of the residual representation and said reference; and
5. a calculation of the position of the terminal using the or any of the time offsets.

32. A computer program or programs comprising computer program code means adapted to perform the steps of the computing device of claim 30.

33. A computer program or programs comprising computer program code means adapted to perform the steps of the computing device of claim 31.

* * * * *